(12) United States Patent
Hikita et al.

(10) Patent No.: US 10,309,294 B2
(45) Date of Patent: Jun. 4, 2019

(54) ENGINE

(71) Applicants: MAZDA MOTOR CORPORATION, Aki-gun, Hiroshima (JP); DENSO CORPORATION, Kariya, Aichi (JP)

(72) Inventors: Takayuki Hikita, Hiroshima (JP); Masahisa Yamakawa, Hiroshima (JP); Tomonori Urushihara, Yokohama (JP); Kazuhiro Nagatsu, Hiroshima (JP); Tatsuya Fujikawa, Higashihiroshima (JP); Takashi Youso, Hiroshima (JP); Takaaki Nagano, Higashihiroshima (JP); Yuuki Kawai, Kariya (JP); Toshifumi Hayami, Kariya (JP)

(73) Assignees: MAZDA MOTOR CORPORATION, Aki-Gun, Hiroshima (JP); DENSO CORPORATION, Kariya, Aichi (JP)

( * ) Notice: Subject to any disclaimer, the term of this patent is extended or adjusted under 35 U.S.C. 154(b) by 0 days.

(21) Appl. No.: 15/759,495

(22) PCT Filed: Sep. 23, 2016

(86) PCT No.: PCT/JP2016/078069
§ 371 (c)(1),
(2) Date: Mar. 12, 2018

(87) PCT Pub. No.: WO2017/051889
PCT Pub. Date: Mar. 30, 2017

(65) Prior Publication Data
US 2018/0258884 A1    Sep. 13, 2018

(30) Foreign Application Priority Data

Sep. 25, 2015 (JP) .................................. 2015-188464

(51) Int. Cl.
*F02B 23/06* (2006.01)
*F02B 23/08* (2006.01)
(Continued)

(52) U.S. Cl.
CPC ...... *F02B 23/0651* (2013.01); *F02B 23/0696* (2013.01); *F02B 23/101* (2013.01);
(Continued)

(58) Field of Classification Search
CPC .... F02M 23/10; F02M 61/18; F02M 61/1826; F02M 61/1813; F02F 3/26; F02B 23/10;
(Continued)

(56) References Cited

U.S. PATENT DOCUMENTS 5,927,244 A * 7/1999 Yamauchi ............. F02B 23/101
                                                    123/295
6,499,457 B2 * 12/2002 Suzuki .................. F02B 23/101
                                                    123/295
(Continued)

FOREIGN PATENT DOCUMENTS

EP   2952707 A1 * 9/2015  ............. F02B 23/06
JP   2000161068 A * 6/2000 ............ F02B 23/101
(Continued)

OTHER PUBLICATIONS

ISA Japan Patent Office, International Search Report Issued in PCT Application No. PCT/JP2016/078069, dated Nov. 8, 2016, WIPO, 1 page.

*Primary Examiner* — Sizo B Vilakazi
*Assistant Examiner* — Brian R Kirby
(74) *Attorney, Agent, or Firm* — Alleman Hall Creasman & Tuttle LLP

(57) ABSTRACT

An engine includes: a piston including a cavity; a cylinder head configured so as to form a combustion chamber having a pent roof shape; a fuel injection valve configured to inject
(Continued)

fuel from a second half of a compression stroke until a first half of an expansion stroke; and a spark plug arranged at a position corresponding to an upper side of the cavity. Injection openings which are arranged in a circumferential direction surrounding a longitudinal axis of the valve and through each of which the fuel is injected in a direction inclined relative to the longitudinal axis by a predetermined angle is formed such that when a height of a ceiling of the combustion chamber at a position corresponding to an edge end portion of the cavity in an injection direction of the injection opening is large, the injection angle of the injection opening is large.

2 Claims, 9 Drawing Sheets

(51) Int. Cl.
  *F02B 23/10* (2006.01)
  *F02M 61/18* (2006.01)
  *F02F 3/26* (2006.01)
  *F02M 23/10* (2006.01)

(52) U.S. Cl.
  CPC .... *F02M 61/1813* (2013.01); *F02M 61/1826* (2013.01); *F02B 2023/085* (2013.01); *F02B 2023/102* (2013.01); *F02B 2023/103* (2013.01); *F02F 3/26* (2013.01); *F02M 23/10* (2013.01); *F02M 61/18* (2013.01); *Y02T 10/125* (2013.01); *Y02T 10/146* (2013.01)

(58) Field of Classification Search
  CPC .............. F02B 23/101; F02B 2023/102; F02B 23/0696; F02B 2023/085; F02B 2023/103; F02B 23/651; Y02T 10/125; Y02T 10/146

USPC ........................................................ 123/445
See application file for complete search history.

(56) References Cited

U.S. PATENT DOCUMENTS

| | | | | |
|---|---|---|---|---|
| 6,672,276 B2* | 1/2004 | Hiraya | .................. | F02B 23/101 123/276 |
| 7,513,238 B2* | 4/2009 | Pfaff | .................... | F02B 23/0651 123/276 |
| 7,861,685 B2* | 1/2011 | Sono | ......................... | F02B 1/08 123/298 |
| 2008/0210198 A1* | 9/2008 | Yamada | ................ | F02B 23/101 123/431 |
| 2010/0006061 A1* | 1/2010 | Shibata | ............... | F02B 23/0621 123/307 |
| 2010/0108022 A1* | 5/2010 | Sono | ................... | F02B 23/0621 123/276 |
| 2010/0147260 A1* | 6/2010 | Yamaguchi | ......... | F02B 23/0651 123/276 |
| 2014/0299107 A1* | 10/2014 | Iwai | ..................... | F02D 41/006 123/478 |
| 2015/0361867 A1* | 12/2015 | Michikawauchi | .. | F02B 23/0651 123/294 |
| 2016/0201596 A1* | 7/2016 | Nagano | ............... | F02B 23/0696 123/305 |

FOREIGN PATENT DOCUMENTS

| | | | | | |
|---|---|---|---|---|---|
| JP | 2002188448 A | * | 7/2002 | ............ | F02B 23/101 |
| JP | 2007085333 A | * | 4/2007 | ......... | F02M 51/0671 |
| JP | 2010144540 A | * | 7/2010 | ........... | Y02T 10/125 |
| JP | 2010144540 A | | 7/2010 | | |
| JP | WO/2013/080454 | * | 6/2013 | | |
| JP | WO2013/080454 A1 | * | 6/2013 | ............ | F02D 41/04 |
| JP | 2014043782 A | | 3/2014 | | |

* cited by examiner

| INJECTION OPENING | FUEL INJECTION REGION | RATIO OF VOLUMES | INJECTION OPENING DIAMETER (mm) | RATIO OF OPENING AREAS | CEILING HEIGHT h (mm) | INJECTION ANGLE θ (deg) | INJECTED FUEL FLOW PATH LENGTH L (mm) |
|---|---|---|---|---|---|---|---|
| A | $V_A$ | 1.3 | 0.109 | 1.3 | 2.80 | 55 | 40.00 |
| B | $V_B$ | 1.1 | 0.100 | 1.1 | 0.90 | 52 | 40.00 |
| C | $V_C$ | 1 | 0.095 | 1 | 0.00 | 50 | 40.00 |
| D | $V_D$ | 1 | 0.095 | 1 | 0.00 | 50 | 40.00 |
| E | $V_E$ | 1.1 | 0.100 | 1.1 | 0.90 | 52 | 40.00 |
| F | $V_F$ | 1.3 | 0.109 | 1.3 | 2.80 | 55 | 40.00 |
| G | $V_G$ | 1.1 | 0.100 | 1.1 | 0.90 | 52 | 40.00 |
| H | $V_H$ | 1 | 0.095 | 1 | 0.00 | 50 | 40.00 |
| I | $V_I$ | 1 | 0.095 | 1 | 0.00 | 50 | 40.00 |
| J | $V_J$ | 1.1 | 0.100 | 1.1 | 0.90 | 52 | 40.00 |

Fig. 9

ENGINE

TECHNICAL FIELD

The present invention relates to an engine, and particularly to an engine configured to inject fuel directly to a combustion chamber in a cylinder in a predetermined operation range in a period from a second half of a compression stroke until a first half of an expansion stroke and perform ignition after a compression top dead center.

BACKGROUND ART

Typically, engines using gasoline or fuel containing gasoline as a major component widely adopt a spark ignition method of performing ignition by a spark plug. To improve fuel efficiency and the like, a technology has been developed in recent years, in which: a high compression ratio (for example, 14 or more) is applied as a geometrical compression ratio of the engine; gasoline or fuel containing gasoline as a major component is used; and in a predetermined operation range, compression self ignition (specifically, homogeneous-charge compression ignition (HCCI)) is performed.

A combustion chamber structure of the engine configured to perform the compression self ignition is disclosed in, for example, PTL 1. Regarding a combustion chamber structure applied to a high compression ratio engine, PTL 1 discloses a technology of improving filling efficiency by configuring the combustion chamber structure such that an inside of a cavity formed on a middle portion of a piston upper surface is adequately scavenged.

CITATION LIST

Patent Literature

PTL 1: Japanese Laid-Open Patent Application Publication No. 2014-43782

SUMMARY OF INVENTION

Technical Problem to the above-described high compression ratio engine, in a predetermined operation range (for example, a low-rotation high-load range), to suppress so-called preignition, it is necessary to: inject fuel from a plurality of injection openings of a fuel injection valve in a period from a second half of a compression stroke until a first half of an expansion stroke; perform forced ignition by a spark plug after a compression top dead center; and complete combustion in a short period of time.

However, for example, when a combustion chamber ceiling of an engine is formed in a gable roof shape (pent roof shape), shapes of paths along which the fuel injected from the injection openings flows in the combustion chamber are not the same as one another, so that arrival positions of the fuel at the time of the spark ignition are different from one another. In addition, a time from when the fuel is injected until when the fuel is ignited is short. Therefore, a thick part and thin part of the fuel-air mixture tend to be generated in the combustion chamber at the time of spark ignition, i.e., homogeneity of the fuel-air mixture in the combustion chamber tends not to be secured. When the homogeneity of the fuel-air mixture is not secured as above, the fuel-air mixture containing the fuel is discharged without being combusted, or combustion (after-burning) occurs after a combustion timing. Thus, the fuel efficiency deteriorates. In addition, smoke is generated, and emission also deteriorates.

The present invention was made to solve the above problems, and an object of the present invention is to provide an engine configured to inject fuel in a period from a second half of a compression stroke until a first half of an expansion stroke and perform ignition after a compression top dead center, the engine being capable of appropriately securing homogeneity of a fuel-air mixture in a combustion chamber at an ignition timing.

Solution to Problem

To achieve the above object, an engine according to the present invention is an engine configured to inject fuel directly to a combustion chamber in a cylinder in a predetermined operation range in a period from a second half of a compression stroke until a first half of an expansion stroke and perform ignition after a compression top dead center, the engine including: a piston including a cavity that is concave downward at a middle portion of an upper surface of the piston; a cylinder head configured so as to form a combustion chamber having a pent roof shape; a fuel injection valve arranged at the cylinder head so as to be located at a position corresponding to a middle portion of the piston, the fuel injection valve being configured to inject the fuel into the cavity of the piston in the period from the second half of the compression stroke until the first half of the expansion stroke; and a spark plug arranged at the cylinder head so as to be provided at a position located at a radially outer side of the middle portion of the piston and corresponding to an upper side of the cavity of the piston, the middle portion corresponding to a position where the fuel injection valve is provided, wherein: the fuel injection valve includes a plurality of injection openings which are arranged in a circumferential direction surrounding a longitudinal axis of the fuel injection valve and through each of which the fuel is injected in a direction inclined relative to the longitudinal axis by a predetermined injection angle; and each of the injection openings is formed such that when a height of a ceiling of the combustion chamber at a position corresponding to an edge end portion of the cavity in an injection direction of the injection opening is large, the injection angle of the injection opening is large.

According to the present invention configured as above, each of the plurality of injection openings which are arranged in the circumferential direction surrounding the longitudinal axis of the fuel injection valve and through each of which the fuel is injected in a direction inclined relative to the longitudinal axis by a predetermined injection angle is formed such that when the height of the ceiling of the combustion chamber at a position corresponding to the edge end portion of the cavity in the injection direction of the injection opening is large, the injection angle of the injection opening is large. Therefore, the increase in the injected fuel flow path length by the large height of the ceiling of the combustion chamber at a position corresponding to the edge end portion of the cavity in the injection direction of the injection opening can be suppressed by the increase in the injection angle of the injection opening. With this, timings at which the fuel injected from the injection openings reaches the combustion chamber ceiling can be set to be equal to one another. Thus, the homogeneity of the fuel-air mixture in the combustion chamber at the ignition timing can be surely secured.

Further, in the present invention, preferably, the injection angles of the injection openings are set such that each of injected fuel flow path lengths each of which is a length of a path along which the fuel injected from the injection opening flows through the cavity to reach the ceiling of the combustion chamber becomes equal to the injected fuel flow path length of the injection opening located closest to the spark plug.

According to the present invention configured as above, the timing at which the fuel injected from each injection opening reaches the combustion chamber ceiling can be set to be equal to the timing at which the fuel-air mixture containing the fuel injected from the injection opening located closest to the spark plug reaches the vicinity of the spark plug. Thus, while securing the homogeneity of the fuel-air mixture in the combustion chamber at the ignition timing, the ignitability of the spark plug can be appropriately secured.

Advantageous Effects of Invention

The engine according to the present invention is an engine configured to inject fuel in a period from a second half of a compression stroke until a first half of an expansion stroke and perform ignition after a compression top dead center, and homogeneity of a fuel-air mixture in a combustion chamber of the engine can be appropriately secured.

BRIEF DESCRIPTION OF DRAWINGS

FIG. 9 is a table showing injection opening diameters and injection angles of the injection openings of the fuel injection valve according to the embodiment of the present invention.

DESCRIPTION OF EMBODIMENTS

Hereinafter, an engine according to an embodiment of the present invention will be explained in reference to the drawings.

First, before explaining details of the embodiment of the present invention, a premise configuration of the engine according to the embodiment of the present invention will be briefly explained. The engine according to the embodiment of the present invention drives at a high compression ratio such as a geometrical compression ratio of 14 or more (preferably 18 to 20) and also performs homogeneous-charge compression ignition called HCCI in a predetermined low-load range. Further, in a predetermined operation range (for example, a low-rotation high-load range), to suppress preignition and the like, the engine according to the embodiment of the present invention injects fuel (performs retarded injection) in a period from a second half of a compression stroke until a first half of an expansion stroke and performs ignition after a compression top dead center. Such premise configuration of the engine is realized by control of an ECU (Electronic Control Unit) in a vehicle.

Figure 1:
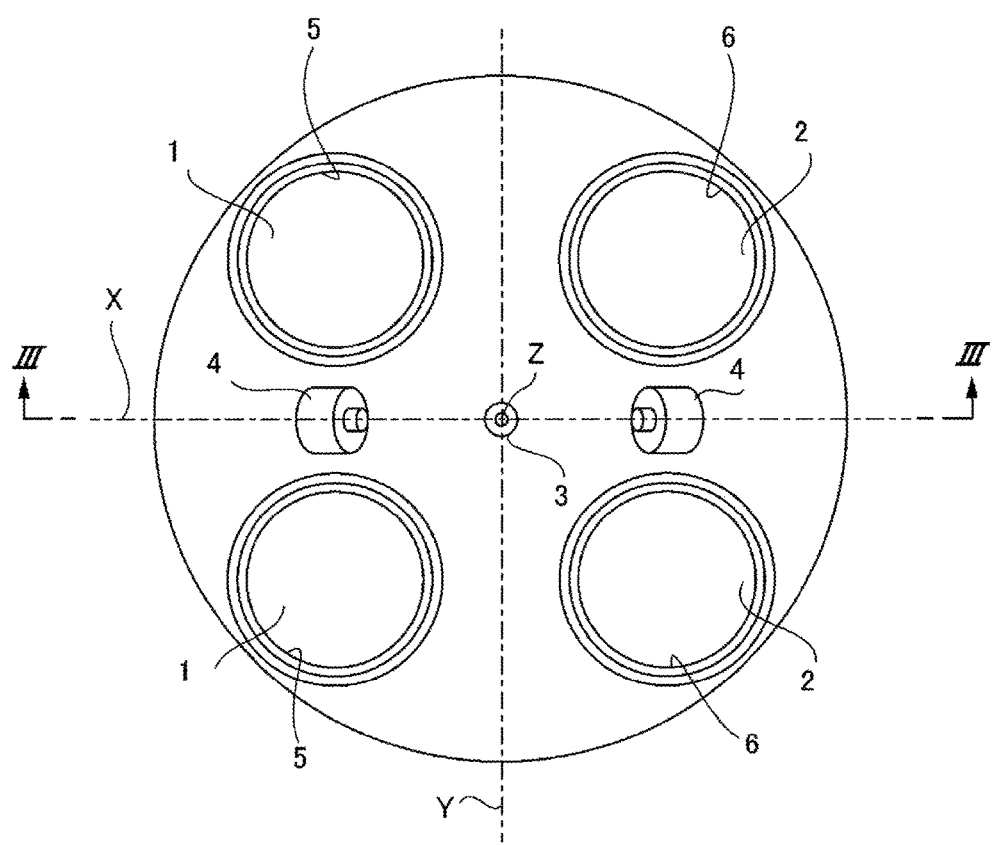
FIG. 1 is a schematic plan view showing one cylinder of an engine according to an embodiment of the present invention when viewed from a lower side in a cylinder axial direction.
Figure 2:
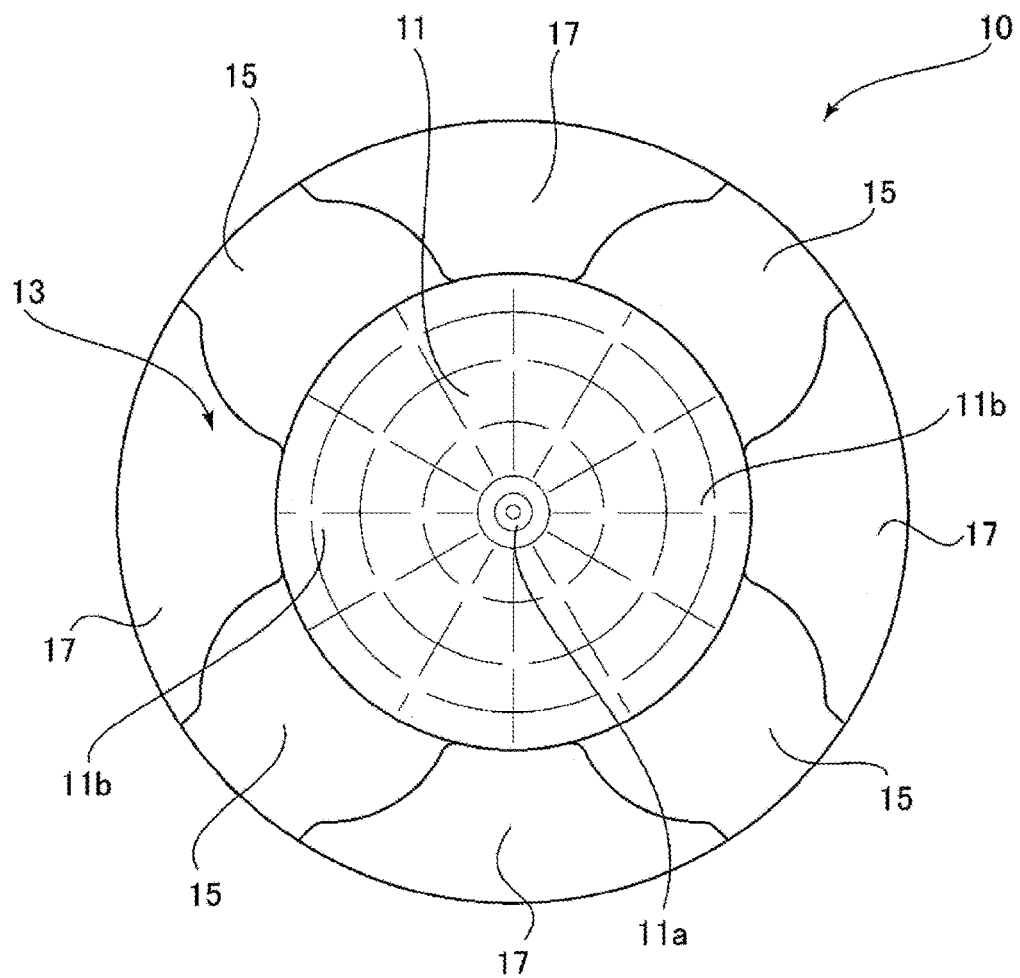
FIG. 2 is a plan view showing a piston according to the embodiment of the present invention when viewed from an upper side in the cylinder axial direction.
Figure 3:
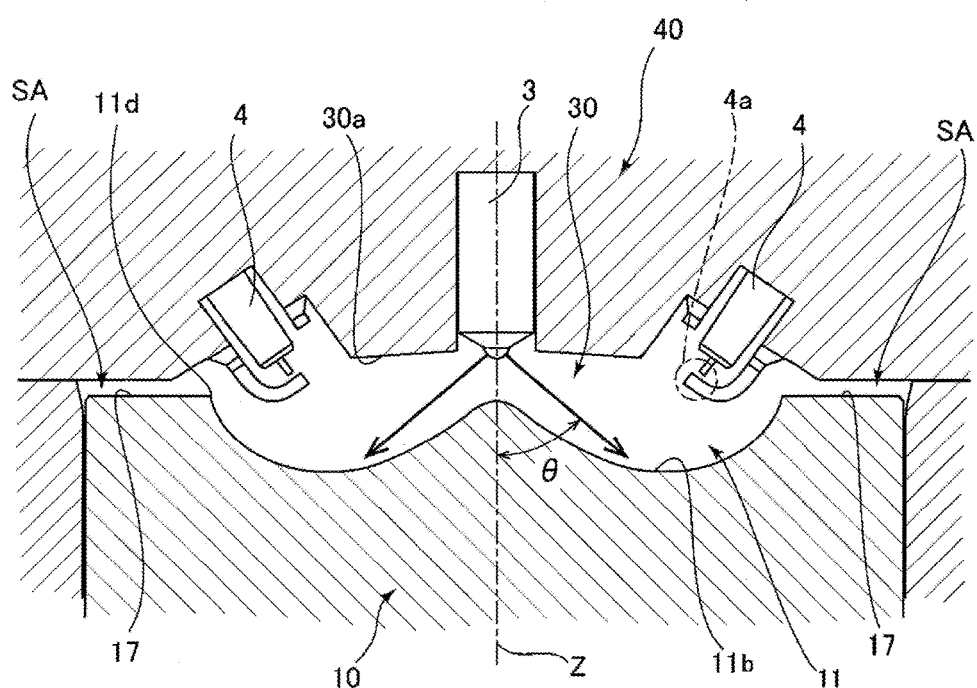
FIG. 3 is a partial sectional view taken along line of FIG. 1 and showing the piston, a cylinder head, and the like according to the embodiment of the present invention.

Next, a combustion chamber structure of the engine according to the embodiment of the present invention will be specifically explained in reference to FIGS. 1 to 3.

FIG. 1 is a schematic plan view showing one cylinder of the engine according to the embodiment of the present invention when viewed from a lower side in a cylinder axial direction. FIG. 2 is a plan view showing a piston according to the embodiment of the present invention when viewed from an upper side in the cylinder axial direction. FIG. 3 is a partial sectional view taken along line of FIG. 1 and showing the piston, a cylinder head, and the like according to the embodiment of the present invention. It should be noted that FIG. 3 is a diagram when the piston is located at the compression top dead center.

In FIG. 1, a reference sign Z denotes a cylinder axis extending in a direction perpendicular to a paper surface, and a reference sign Y denotes a line segment extending in a paper surface upward/downward direction and corresponding to a crank axis. The engine according to the present embodiment adopts a combustion chamber including a combustion chamber ceiling located at the cylinder head and having a gable roof shape (pent roof shape) (also see FIG. 3). The line segment shown by the reference sign Y corresponds to a pent roof-shaped ridgeline (hereinafter suitably referred to as "pent roof ridgeline") constituting the combustion chamber. Further, a reference sign X denotes a line segment extending through a center of the combustion chamber, i.e., a center axis of the cylinder and perpendicular to the pent roof ridgeline Y. It should be noted that FIG. 3 is a sectional view taken along a surface spreading along the line segment X perpendicular to the pent roof ridgeline Y and showing a part of the piston, the cylinder head, and the like.

As shown in FIG. 1, one cylinder includes two intake valves 1 provided at one of regions (i.e., a left region in FIG. 1) sandwiching the pent roof ridgeline Y. These two intake valves 1 are provided so as to be lined up in a direction along the pent roof ridgeline Y. Reference signs 5 in FIG. 1 denote intake ports that are opened and closed by the respective intake valves 1. Further, the cylinder includes two exhaust valves 2 provided at the other of the regions (i.e., a right region in FIG. 1) sandwiching the pent roof ridgeline Y. The two exhaust valves 2 are provided so as to be lined up in the direction along the pent roof ridgeline Y. Reference signs 6 in FIG. 1 denote exhaust ports that are opened and closed by the respective exhaust valves 2. Furthermore, one fuel injection valve 3 is provided on the cylinder axis Z. In addition, one of two spark plugs 4 is provided between the two intake valves 1, and the other of the two spark plugs 4 is provided between the two exhaust valves 2.

Next, as shown in FIG. 2, a cavity 11 that is concave downward is formed at a middle portion of an upper surface of a piston 10 (also see FIG. 3). Specifically, the cavity 11 is formed to have a substantially circular shape when viewed from a direction along the cylinder axis Z, and a mountain-shaped protruding portion 11a is formed at a middle portion of the cavity 11. A concave portion 11b having a lower height than the protruding portion 11a is formed at a radially outer side of the protruding portion 11a so as to surround the protruding portion 11a. The fuel injection valve 3 is arranged right above the protruding portion 11a of the cavity 11, and the two spark plugs 4 are arranged in the concave portion 11b of the cavity 11 (also see FIGS. 1 and 3).

Further, an annular portion 13 extending from an outer edge of the cavity 11 to an outer edge of the upper surface of the piston 10 and surrounding a radially outer side of the cavity 11 is provided at an upper portion of the piston 10. The annular portion 13 includes four valve recesses 15 each of which is concave downward by, for example, about 1 mm. These four valve recesses 15 are provided at positions corresponding to the two intake valves 1 and positions corresponding to the two exhaust valves 2. Further, portions 17 each located between the adjacent valve recesses 15 are not concave (i.e., are higher than the valve recesses 15) and are substantially flat. Hereinafter, the portion 17 between the valve recesses 15 is suitably referred to as a "piston upper surface portion 17."

Next, as shown in FIG. 3, the fuel injection valve 3 is provided at a portion of a cylinder head 40, the portion corresponding to the middle portion of the piston 10. Specifically, the fuel injection valve 3 is provided such that a longitudinal axis of the fuel injection valve 3 coincides with the cylinder axis Z. The fuel injection valve 3 injects the fuel directly to the combustion chamber 30. The fuel injection valve 3 includes a plurality of injection openings 27, and the fuel is sprayed from the injection openings 27 so as to form a conical shape that is symmetrical about the cylinder axis Z. In this case, an injection angle θ of the fuel injected by the fuel injection valve 3 through the injection openings 27 is set such that the fuel injected based on the control of the ECU in the period from the second half of the compression stroke until the first half of the expansion stroke (for example, 60° before top dead center) gets into the cavity 11 of the piston 10 (see arrows of FIG. 3), in other words, the fuel does not collide with the annular portion 13 of the piston 10 or a cylinder side wall (for example, a cylinder liner). Further, the injection angle θ of the fuel injection valve 3 is set such that a spray collision distance from a fuel injection position to a position of the cavity 11 with which the fuel collides is larger than a length (division length) from the fuel injection position to a position where an initial division of the fuel occurs.

It should be noted that the injection angle θ corresponds to an inclination angle of the injection direction of the fuel injected from each injection opening 27, the inclination angle being defined based on the longitudinal axis (i.e., the cylinder axis Z) of the fuel injection valve 3. Further, the fuel is supplied to the fuel injection valve 3 at relatively high fuel pressure (for example, 40 to 120 MPa).

Further, the two spark plugs 4 are provided at portions of the cylinder head 40, the portions being located at a radially outer side of the middle portion of the piston 10 and corresponding to an upper side of the cavity 11 of the piston 10. To be specific, each of the spark plugs 4 is provided at such a position that an electrode 4a of a tip end portion of the spark plug 4 is located within the cavity 11 in a radial direction. Further, each of the spark plugs 4 is arranged such that the electrode 4a is located along a combustion chamber ceiling 30a (in other words, along a lower surface of the cylinder head 40; The same is true in the following explanations). Specifically, each of the spark plugs 4 is provided at the cylinder head 40 such that an inclination direction of the electrode 4a is set along an inclination of the combustion chamber ceiling 30a while suppressing projection of the electrode 4a toward the combustion chamber 30 as much as possible.

It should be noted that in FIG. 3, an area shown by a reference sign SA denotes a squish area that is a space formed at a gap between the piston upper surface portion 17 and the combustion chamber ceiling 30a. The squish area SA is formed not only at the gap between the piston upper surface portion 17 and the combustion chamber ceiling 30a but also at a gap between the combustion chamber ceiling 30a and each of upper surfaces of the valve recesses 15 (see FIG. 2) provided at positions corresponding to the intake valves 1 and the exhaust valves 2.

Figure 4:
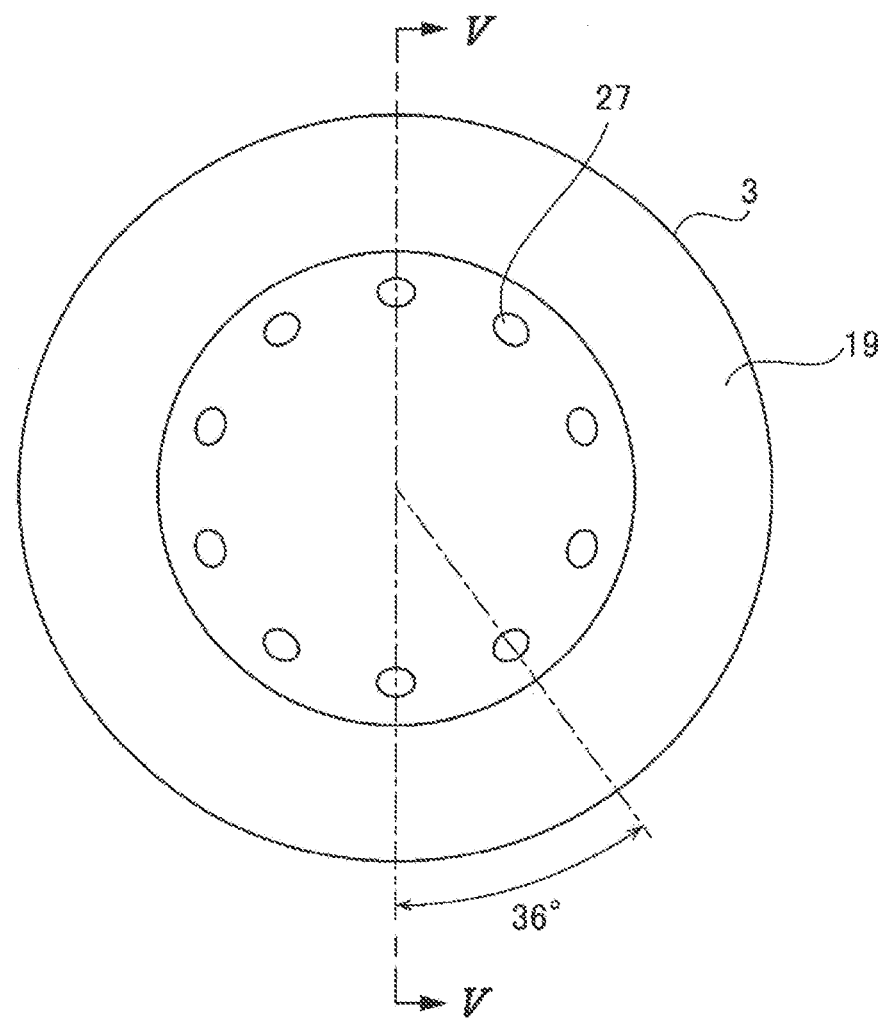
FIG. 4 is a plan view showing a tip end portion of a fuel injection valve according to the embodiment of the present invention when viewed from a lower side in a direction along a longitudinal axis of the fuel injection valve.
Figure 5:
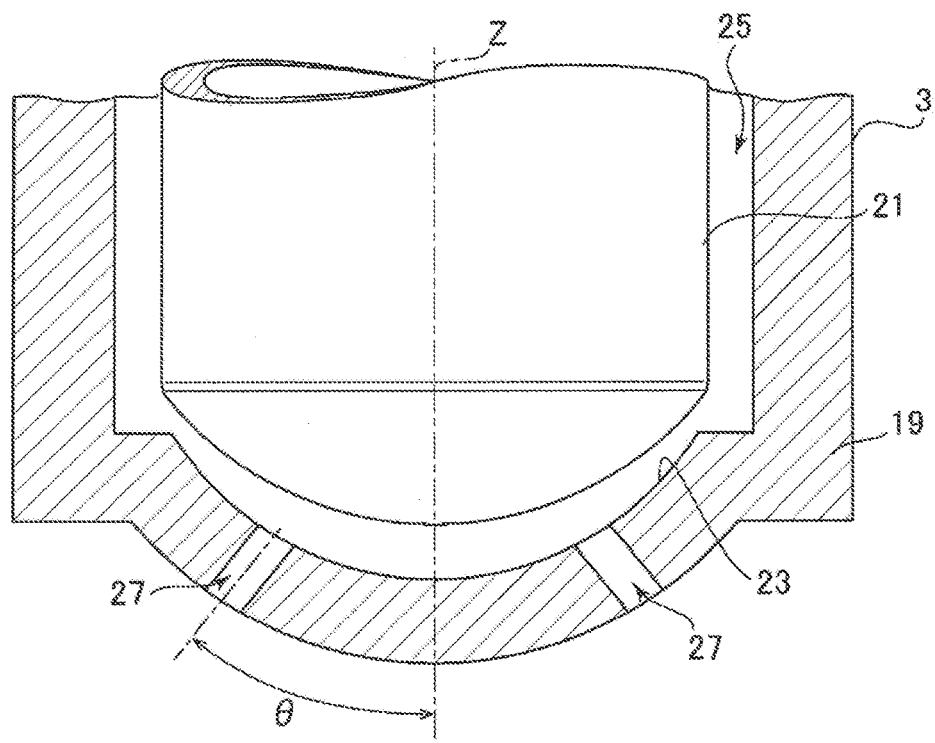
FIG. 5 is a partial sectional view taken along line V-V of FIG. 4 and showing the tip end portion of the fuel injection valve according to the embodiment of the present invention.

Next, the fuel injection valve 3 according to the embodiment of the present invention will be explained in detail in reference to FIGS. 4 and 5. FIG. 4 is a plan view showing a tip end portion of the fuel injection valve 3 according to the embodiment of the present invention when viewed from a lower side in a direction along the longitudinal axis of the fuel injection valve 3. FIG. 5 is a partial sectional view taken along line V-V of FIG. 4 and showing the tip end portion of the fuel injection valve 3 according to the embodiment of the present invention.

As shown in FIGS. 4 and 5, the fuel injection valve 3 includes a bottomed cylindrical valve body extending in the direction along the longitudinal axis of the fuel injection valve 3. A columnar needle 21 extending in the direction along the longitudinal axis of the fuel injection valve 3 is provided in the valve body 19. The needle 21 is driven by a high-responsiveness solenoid (not shown) in an upward/downward direction along the longitudinal axis of the fuel injection valve 3. A bottom surface of the valve body 19 is formed in a concave spherical shape that is concave downward. A seat portion 23 is formed at an outer peripheral portion of the bottom surface of the valve body 19. A tip end portion of the needle 21 moved downward by the high-responsiveness solenoid is pressed against the seat portion 23. Further, a space between an inner peripheral surface of the valve body 19 and an outer peripheral surface of the needle 21 is a fuel passage 25. Furthermore, a plurality of injection openings 27 are formed on the bottom surface of the valve body so as to be located at a tip end side of the seat portion 23.

The injection openings 27 are arranged in a circumferential direction surrounding the longitudinal axis of the fuel injection valve 3. Each of the injection openings 27 is formed such that the fuel is injected in a direction inclined relative to the longitudinal axis of the fuel injection valve 3 by a predetermined injection angle θ. In the present embodiment, as shown in FIG. 4, ten injection openings 27 are arranged on the fuel injection valve 3 at equal angular intervals (i.e., at intervals of 36°) in the circumferential direction surrounding the longitudinal axis of the fuel injection valve 3. Further, as shown in FIG. 5, each of the injection openings 27 are formed such that an angle formed by a center axis of the injection opening 27 and the longitudinal axis of the fuel injection valve 3 becomes θ.

Next, the sizes and injection angles of the injection openings 27 of the fuel injection valve 3 according to the embodiment of the present invention will be explained in reference to FIGS. 6 to 9.

Figure 6:
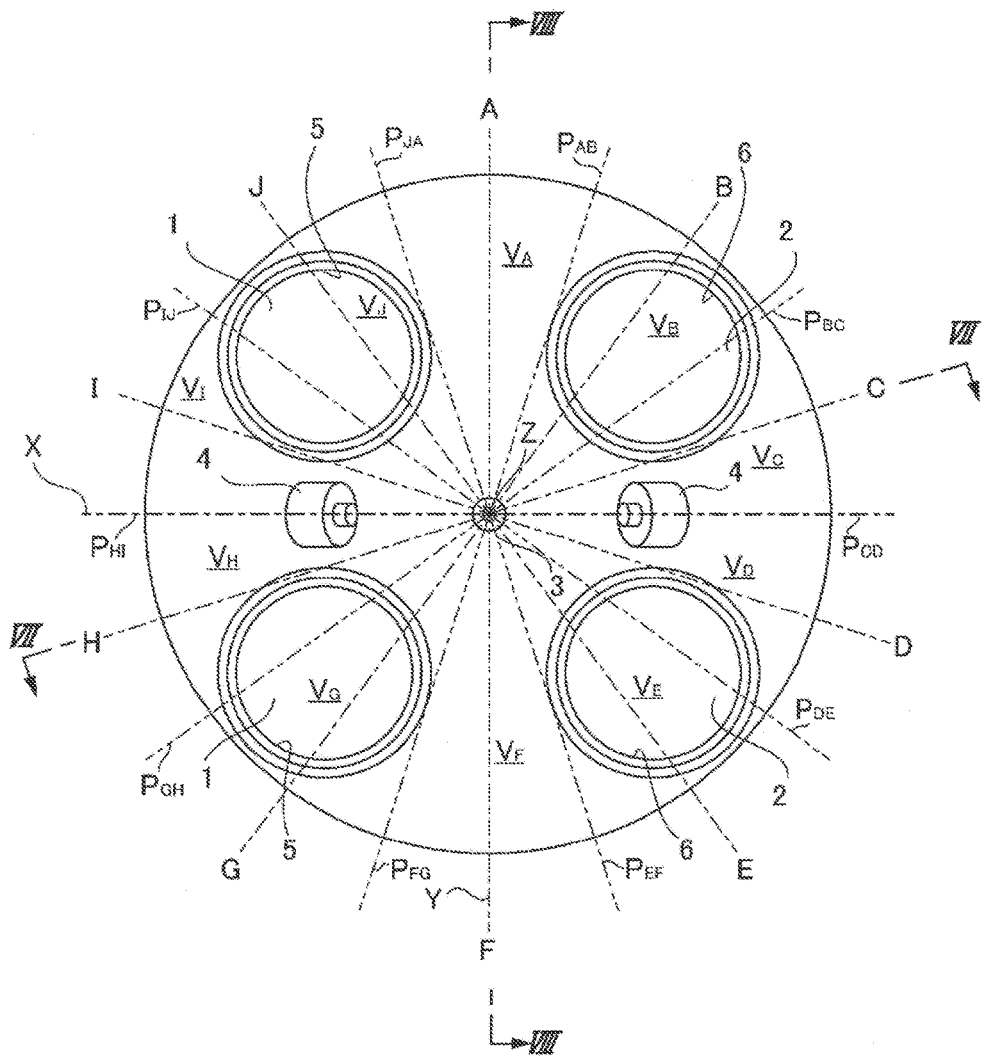
FIG. 6 is a schematic plan view showing one cylinder of the engine according to the embodiment of the present invention when viewed from the lower side in the cylinder axial direction and is a diagram showing a plurality of fuel injection regions located in respective injection directions of injection openings of the fuel injection valve according to the embodiment of the present invention.
Figure 7:
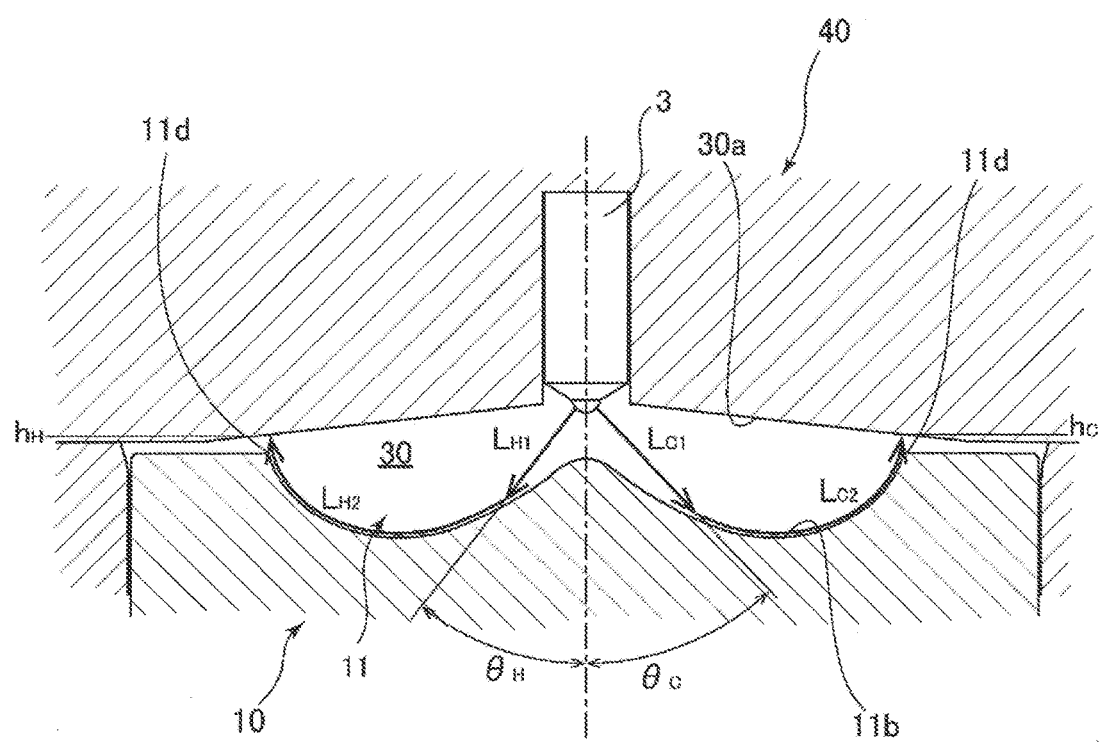
FIG. 7 is a partial sectional view taken along line VII-VII of FIG. 6 and showing the piston, the cylinder head, and the like according to the embodiment of the present invention and is a diagram showing injected fuel flow paths of the fuel injected from the injection openings of the fuel injection valve according to the embodiment of the present invention.
Figure 8:
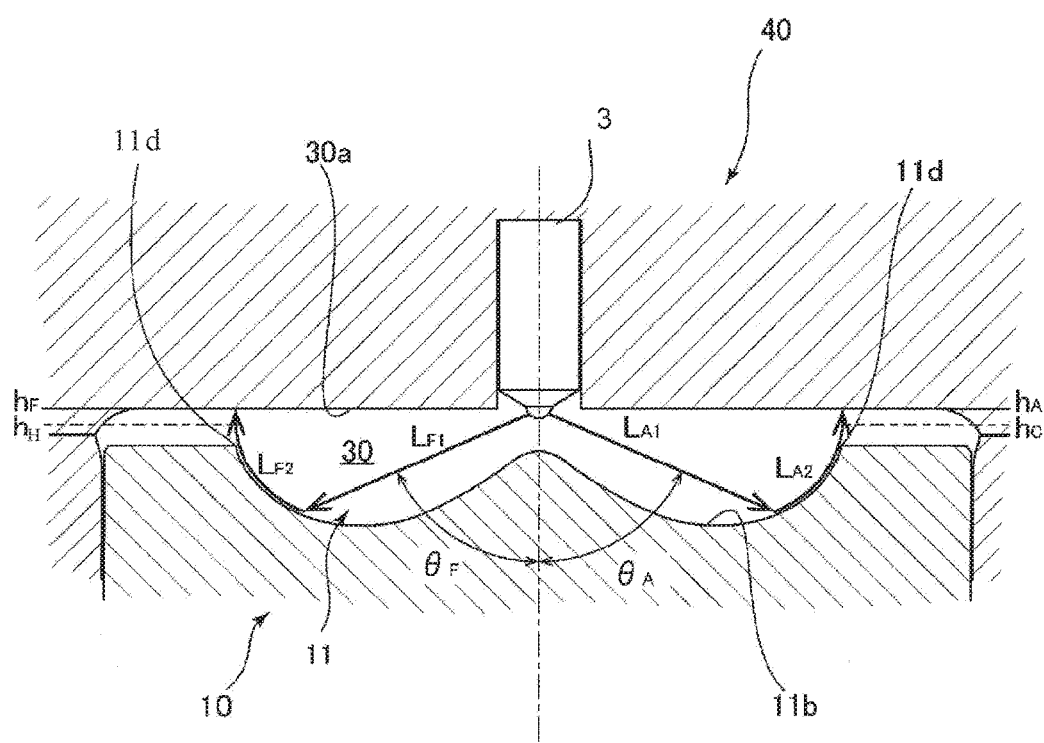
FIG. 8 is a partial sectional view taken along line VIII-VIII of FIG. 6 and showing the piston, the cylinder head, and the like according to the embodiment of the present invention and is a diagram showing the injected fuel flow paths of the fuel injected from the injection openings of the fuel injection valve according to the embodiment of the present invention.

FIG. 6 is a schematic plan view showing one cylinder of the engine according to the embodiment of the present invention when viewed from the lower side in the cylinder axial direction and is a diagram showing a plurality of fuel injection regions located in respective injection directions of the injection openings 27 of the fuel injection valve 3 according to the embodiment of the present invention. FIG. 7 is a partial sectional view taken along line VII-VII of FIG. 6 and showing the piston 10, the cylinder head 40, and the like according to the embodiment of the present invention and is a diagram showing the injected fuel flow paths of the fuel injected from the injection openings 27 of the fuel injection valve 3 according to the embodiment of the present invention. FIG. 8 is a partial sectional view taken along line VIII-VIII of FIG. 6 and showing the piston 10, the cylinder head 40, and the like according to the embodiment of the present invention and is a diagram showing the injected fuel flow paths of the fuel injected from the injection openings 27 of the fuel injection valve 3 according to the embodiment of the present invention. FIG. 9 is a table showing injection opening diameters and injection angles of the injection openings 27 of the fuel injection valve 3 according to the embodiment of the present invention.

First, as shown in FIG. 6, to determine the sizes of the injection openings 27, the combustion chamber 30 at the compression top dead center is divided into a plurality of fuel injection regions by virtual vertical surfaces each extending in a radial direction of the cylinder from the longitudinal axis of the fuel injection valve 3 through a middle between the adjacent injection openings 27.

In the example of FIG. 6, ten injection openings 27 of the fuel injection valve 3 are shown by respective letters A-J, and directions in which the injection openings 27 are directed are shown by one-dot chain lines. To be specific, when the cylinder is viewed from the lower side in the cylinder axial direction, the injection opening 27 directed upward on the paper surface of FIG. 6 in the direction along the pent roof ridgeline Y is shown by the letter A, and the other injection openings 27 are shown by the respectively letters B-J clockwise.

Then, a fuel injection region $V_A$ located in the injection direction of the injection opening A is defined by: a virtual vertical surface $P_{AB}$ extending in the radial direction of the cylinder from the longitudinal axis (i.e., the cylinder axis Z) of the fuel injection valve 3 through the middle between the adjacent injection openings A and B; and a virtual vertical surface $P_{JA}$ extending in the radial direction of the cylinder from the longitudinal axis (i.e., the cylinder axis Z) of the fuel injection valve 3 through the middle between the adjacent injection openings J and A. Similarly, fuel injection regions $V_B$ to $V_J$ located at the respective injection directions of the injection openings B to J are defined. As shown in FIG. 6, each of the fuel injection regions is formed in a fan shape in plan view, and the fuel injection regions are arranged in the circumferential direction surrounding the longitudinal axis of the fuel injection valve 3.

Each of the injection openings 27 is formed such that in a case where the combustion chamber 30 is divided into the plurality of fuel injection regions corresponding to the respective injection openings 27 as above, and when the volume of the fuel injection region located in the injection direction of the injection opening 27 is large, an opening area of the injection opening 27 is large. More preferably, the injection openings 27 are formed such that a ratio of the opening areas of the injection openings 27 and a ratio of the volumes of the fuel injection regions located in the respective injection directions of the injection openings 27 coincide with each other.

In the example of FIG. 6, the volumes of the fuel injection regions $V_A$ and $V_F$ each defined so as to extend in the direction along the pent roof ridgeline Y and each having a largest height (i.e., distance between the upper surface of the piston 10 and the combustion chamber ceiling 30a) are the largest, and the volumes of the fuel injection regions $V_C$, $V_D$, $V_H$, and $V_I$ each defined so as to extend in a direction closest to the line segment X perpendicular to the pent roof ridgeline Y are the smallest. As shown in FIG. 9, in the present embodiment, when each of the smallest volumes of the fuel injection regions $V_C$, $V_D$, $V_H$, $V_I$ is regarded as 1, the ratio of the volumes of the fuel injection regions is represented by "$(V_C, V_D, V_H, V_I):(V_B, V_E, V_G, V_J):(V_A, V_F)=1:1.1:1.3$."

In the present embodiment, the injection opening diameters of the injection openings 27 are set such that: the ratio of the opening areas of the injection openings 27 coincides with the ratio of the volumes of the fuel injection regions located in the respective injection directions of the injection openings 27, i.e., "(C, D, H, I):(B, E, J):(A, F)=1:1.1:1.3" is realized; and an average value of the injection opening diameters of the circular injection openings 27 is 0.100 mm. Specifically, as shown in FIG. 9, each of the injection opening diameters of the injection openings C, D, H, and I is set to 0.095 mm. Each of the injection opening diameters of the injection openings B, E, and J is set to 0.100 mm. Each of the injection opening diameters of the injection openings A and F is set to 1.3 mm.

Further, to determine the injection angles of the injection openings 27, injected fuel flow path lengths are specified. Each of the injected fuel flow path lengths is a length of a path along which the fuel injected from the injection opening 27 flows through the cavity 11 to reach the combustion chamber ceiling 30a.

The injected fuel flow path length is calculated as a sum of: a distance from the injection opening 27 of the fuel injection valve 3 to a position where the fuel injected at the injection angle θ collides with a surface of the cavity 11; and a travel distance from the position where the fuel collides with the surface of the cavity 11 to the combustion chamber ceiling 30a through the concave portion 11b of the cavity 11.

In the example of FIG. 7, an injected fuel flow path length $L_C$ of the injection opening C is a sum of: a distance $L_{C1}$ from the injection opening C to a position where the fuel injected at an injection angle $θ_C$ collides with the surface of the cavity 11; and a travel distance $L_{C2}$ from the position where the fuel collides with the surface of the cavity 11 to the combustion chamber ceiling 30a through the concave portion 11b of the cavity 11. An injected fuel flow path length $L_H$ of the injection opening H is a sum of: a distance $L_{H1}$ from the injection opening H to a position where the fuel injected at an injection angle $θ_H$ collides with the surface of the cavity 11; and a travel distance $L_{H2}$ from the position where the fuel collides with the surface of the cavity 11 to the combustion chamber ceiling 30a through the concave portion 11b of the cavity 11.

In the example of FIG. 8, an injected fuel flow path length $L_A$ of the injection opening A is a sum of: a distance $L_{A1}$ from the injection opening A to a position where the fuel injected at an injection angle $\theta_A$ collides with the surface of the cavity 11; and a travel distance $L_{A2}$ from the position where the fuel collides with the surface of the cavity 11 to the combustion chamber ceiling 30a through the concave portion 11b of the cavity 11. An injected fuel flow path length $L_F$ of the injection opening F is a sum of: a distance $L_{F1}$ from the injection opening H to a position where the fuel injected at an injection angle $\theta_F$ collides with the surface of the cavity 11; and a travel distance $L_{F2}$ from the position where the fuel collides with the surface of the cavity 11 to the combustion chamber ceiling 30a through the concave portion 11b of the cavity 11.

In a case where the injection angles of the injection openings 27 are equal to one another, and when a height of the combustion chamber ceiling 30a at a position corresponding to an edge end portion 11d of the cavity 11 in the injection direction of each injection opening 27 is large (i.e., when a distance from the edge end portion 11d of the cavity 11 to the combustion chamber ceiling 30a is long), the corresponding injected fuel flow path length is long. Further, in a case where the heights of the combustion chamber ceiling 30a at positions corresponding to the edge end portion 11d of the cavity 11 in the injection directions of the injection openings 27 are equal to one another, and when the injection angle $\theta$ of each injection opening 27 is large, the corresponding injected fuel flow path length is short.

Therefore, in the present embodiment, each of the injection openings 27 is formed such that when the height of the combustion chamber ceiling 30a at a position corresponding to the edge end portion 11d of the cavity 11 in the injection direction of the injection opening 27 is large, the injection angle of the injection opening 27 is large. Thus, the injected fuel flow path lengths of the injection openings 27 become equal to one another.

In the example of FIG. 6, the heights of the combustion chamber ceiling 30a at positions corresponding to the edge end portion 11d of the cavity 11 in the injection directions of the injection openings C, D, H, and I directed in the direction closest to the line segment X perpendicular to the pent roof ridgeline Y are the smallest. The heights of the combustion chamber ceiling 30a at positions corresponding to the edge end portion 11d of the cavity 11 in the injection directions of the injection openings A and F directed in the direction along the pent roof ridgeline Y are the largest.

For example, as shown in FIGS. 7 and 8, a height $h_C$ of the combustion chamber ceiling 30a at a position corresponding to the edge end portion 11d of the cavity 11 in the injection direction of the injection opening C and a height $h_H$ of the combustion chamber ceiling 30a at a position corresponding to the edge end portion 11d of the cavity 11 in the injection direction of the injection opening H are equal to each other. However, each of a height $h_A$ of the combustion chamber ceiling 30a at a position corresponding to the edge end portion 11d of the cavity 11 in the injection direction of the injection opening A and a height $h_F$ of the combustion chamber ceiling 30a at a position corresponding to the edge end portion 11d of the cavity 11 in the injection direction of the injection opening F is larger than the height $h_C$. Therefore, the injection angle $\theta_C$ of the injection opening C and the injection angle $\theta_H$ of the injection opening H are set to be equal to each other, and each of the injection angle $\theta_A$ of the injection opening A and the injection angle $\theta_F$ of the injection opening H is set to be larger than the injection angle $\theta_C$ of the injection opening C. Thus, the injected fuel flow path lengths of the injection openings A, C, F, and H become equal to one another.

In the present embodiment, as shown in FIG. 9, when each of the heights $h_C$, $h_D$, $h_H$, and $h_I$ of the combustion chamber ceiling 30a at positions corresponding to the edge end portion 11d of the cavity 11 in the injection directions of the injection openings C, D, H, and I is set to 0 mm, each of the heights $h_B$, $h_E$, $h_G$, and $h_J$ of the combustion chamber ceiling 30a at positions corresponding to the edge end portion 11d of the cavity 11 in the injection directions of the injection openings B, E, and J becomes 0.90 mm, and each of the heights $h_A$ and $h_F$ of the combustion chamber ceiling 30a at positions corresponding to the edge end portion 11d of the cavity 11 in the injection directions of the injection openings A and F becomes 2.80 mm.

When each of the injection angles $\theta_C$, $\theta_D$, $\theta_H$, and $\theta_I$ of the injection openings C, D, H, and I each corresponding to the smallest height of the combustion chamber ceiling 30a is set to 50°, each of the injected fuel flow path lengths $L_C$, $L_D$, $L_H$, and $L_I$ is 40 mm.

In this case, when each of the injection angles $\theta_B$, $\theta_E$, $\theta_G$, and $\theta_J$ of the injection openings B, E, and J is set to 52°, and each of the injection angles $\theta_A$ and $\theta_F$ of the injection openings A and F is set to 55°, each of the injected fuel flow path lengths of the injection openings 27 becomes 40 mm. Thus, all of the injected fuel flow path lengths of the injection openings 27 become equal to one another.

Next, modified examples of the embodiment of the present invention will be explained.

The above embodiment has explained the engine including the combustion chamber 30 having the pent roof shape (see FIG. 3, for example). However, the present invention is also applicable to an engine including the combustion chamber 30 having a shape (such as a semispherical shape or a bathtub shape) other than the pent roof shape.

The above embodiment has explained the fuel injection valve 3 including the ten injection openings 27. However, the present invention is also applicable to an engine including the fuel injection valve 3 having a plurality of injection openings 27 other than the ten injection openings 27.

Next, operational advantages of the engines according to the embodiment of the present invention and the modified examples of the embodiment of the present invention will be explained.

First, each of the plurality of injection openings 27 arranged in the circumferential direction surrounding the longitudinal axis of the fuel injection valve 3 is formed such that in a case where the combustion chamber 30 at the compression top dead center is divided into the plurality of fuel injection regions, located in the respective injection directions of the injection openings 27, by the vertical surfaces each extending in the radial direction of the cylinder from the longitudinal axis of the fuel injection valve 3 through the middle between the adjacent injection openings 27, and when the volume of the fuel injection region located in the injection direction of the injection opening 27 is large, the opening area of the injection opening 27 is large. Therefore, even when the volumes of the fuel injection regions located in the respective injection directions of the injection openings 27 are different from one another since, for example, the combustion chamber 30 of the engine is formed in the pent roof shape, the fuel can be injected from the injection openings 27 at the amounts corresponding to the volumes of the fuel injection regions. With this, the homogeneity of the fuel-air mixture in the combustion chamber 30 at the ignition timing can be secured.

Especially, the injection openings 27 are formed such that the ratio of the opening areas of the injection openings 27 and the ratio of the volumes of the fuel injection regions located in the respective injection directions of the injection openings 27 coincide with each other. Therefore, the amount of fuel injected from the injection opening 27 can be set to be proportional to the volume of the fuel injection region located in the injection direction of the injection opening 27. With this, even when the volumes of the fuel injection regions are different from one another, the concentrations of the fuel-air mixtures in the fuel injection regions can be set to be equal to one another. Thus, the homogeneity of the fuel-air mixture in the combustion chamber 30 at the ignition timing can be surely secured.

Each of the plurality of injection openings 27 which are arranged in the circumferential direction surrounding the longitudinal axis of the fuel injection valve 3 and through each of which the fuel is injected in a direction inclined relative to the longitudinal axis by a predetermined injection angle is formed such that when the height of the ceiling of the combustion chamber 30 at a position corresponding to the edge end portion 11d of the cavity 11 in the injection direction of the injection opening 27 is large, the injection angle of the injection opening 27 is large. Therefore, the increase in the injected fuel flow path length by the large height of the ceiling of the combustion chamber 30 at a position corresponding to the edge end portion 11d of the cavity 11 in the injection direction of the injection opening 27 can be suppressed by the increase in the injection angle of the injection opening 27. With this, timings at which the fuel injected from the injection openings 27 reaches the combustion chamber ceiling 30a can be set to be equal to one another. Thus, the homogeneity of the fuel-air mixture in the combustion chamber 30 at the ignition timing can be surely secured.

Especially, the injection angles of the injection openings 27 are set such that each injected fuel flow path length that is the length of the path along which the fuel injected from the injection opening 27 flows through the cavity 11 to reach the ceiling of the combustion chamber 30 becomes equal to the injected fuel flow path length of the injection opening 27 located closest to the spark plug 4. Therefore, the timing at which the fuel injected from each injection opening 27 reaches the combustion chamber ceiling 30a can be set to be equal to the timing at which the fuel-air mixture containing the fuel injected from the injection opening 27 located closest to the spark plug 4 reaches the vicinity of the spark plug 4. Thus, while securing the homogeneity of the fuel-air mixture in the combustion chamber 30 at the ignition timing, the ignitability of the spark plug 4 can be appropriately secured.

LIST OF REFERENCE CHARACTERS

1 intake valve
2 exhaust valve
3 fuel injection valve
4 spark plug
4a electrode
5 intake port
6 exhaust port
10 piston
11 cavity
11a protruding portion
11b concave portion
11c curved surface of cavity
11d edge end portion of cavity
13 annular portion
15 valve recess
17 piston upper surface portion
19 valve body
21 needle
23 seat portion
25 fuel passage
27 injection opening
30 combustion chamber
30a combustion chamber ceiling
40 cylinder head

The invention claimed is:

1. An engine configured to inject fuel directly to a combustion chamber in a cylinder in a predetermined operation range in a period from a second half of a compression stroke until a first half of an expansion stroke and perform ignition after a compression top dead center, the engine comprising:
  a piston including a cavity that is concave downward at a middle portion of an upper surface of the piston;
  a cylinder head configured so as to form the combustion chamber having a pent roof shape;
  a fuel injection valve arranged at the cylinder head so as to be located at a position corresponding to a middle portion of the piston, the fuel injection valve being configured to inject the fuel into the cavity of the piston in the period from the second half of the compression stroke until the first half of the expansion stroke; and
  a spark plug arranged at the cylinder head so as to be provided at a position located at a radially outer side of the middle portion of the piston and corresponding to an upper side of the cavity of the piston, the middle portion corresponding to a position where the fuel injection valve is provided, wherein:
    the fuel injection valve includes a plurality of injection openings, including a first injection opening and a second injection opening, which are arranged in a circumferential direction surrounding a longitudinal axis of the fuel injection valve and through each of which the fuel is injected in a direction inclined relative to the longitudinal axis by a predetermined injection angle; and
    each of the injection openings is formed such that when a height of a ceiling of the combustion chamber at a first position corresponding to a first edge end portion of the cavity in a first injection direction of the injection opening is larger compared to a height of the ceiling of the combustion chamber at a second position corresponding to a second edge end portion in a second injection direction, the injection angle of the first injection opening is larger than an injection angle of the second injection opening which injects fuel in the second injection direction, wherein each of the first edge end portion and second edge end portion of the cavity is formed at a radially inwardmost end of a piston upper surface portion of the piston; and
    the injection angles of the injection openings are set such that, denoting each of injected fuel flow path lengths of the injection openings as a sum of (i) a distance from the injection opening to a position where the fuel injected from the injection opening collides with a surface of the cavity and (ii) a travel distance from the position where the fuel collides with the surface of the cavity to the ceiling of the combustion chamber through a concave portion of the cavity, the injected fuel flow path length of the injection opening located closest to the spark plug and the injected fuel flow path lengths of the other injection openings are equal to one another.

2. The engine of claim 1, wherein the piston upper surface portion is flat at least along the respective directions of the first injection opening and the second injection opening.

* * * * *